United States Patent Office 2,774,137
Patented Dec. 18, 1956

2,774,137

METHOD AND FLUX FOR SOLDERING ALUMINUM

Max Yarow, Philadelphia, Pa.

No Drawing. Application August 4, 1953,
Serial No. 372,403

4 Claims. (Cl. 29—495)

This invention relates to joining of shaped aluminum metal pieces by soldering and in particular to an improved solder flux for soldering aluminum to form a soldered joint of aluminum of such improved joint strength as to make an aluminum solder joint practicable in the art.

The invention further relates to shaped aluminum pieces, such as sheets, rods, tubes and the like, which have been coated with a firmly adherent thin film of solder over at least a joint forming portion of the aluminum as a commercial article of manufacture. Such preformed article may then be united to a similarly coated piece of aluminum or any solderable metal may be soldered thereto by placing the solder film coated aluminum in firm contact with the additional piece of coated aluminum or other solderable metal bearing a similar film at any convenient site of assemblage of the aluminum piece, and heating to fuse the respective solder films between the assembled metals to a firm joint.

The invention further includes improved procedures for forming solder joints, at least one metal of which is aluminum.

Many efforts have been made in the art to solder aluminum but this metal, relatively hard, infusible, and tending to form oxide films at raised temperatures at the surfaces to be joined, has so resisted application of a solder film thereto in attempts to effect soldering thereof as to form no solder film with conventional fluxes.

In comparison, according to the present invention, I am able to solder aluminum using my improved flux to form an even and permanently bonded solder film to the aluminum metal. Such film is so tightly adherent as to be permanent in all ordinary usages even such as involve considerable stress placed upon the joint.

My improved flux allows soldering so effective as to form a substantially strong bond between the solder and the aluminum, which are so strongly adherent that the strength of the joint itself depends primarily on the internal cohesive strength of the solder. Accordingly, while for most soldering operations I use a typical soft solder comprising from about 35 to 65% lead and about 35 to 65% tin, a typical soft solder being usually about 50% lead and 50% tin, where it is desired to further strengthen the aluminum joint, a harder solder containing greatly increased proportions of tin such as 80% or higher may be used.

This harder and stronger solder having a higher tin content is most desirable where a rod, strip, sheet, wire or tube of aluminum is to be pre-prepared with a thin coating of solder for subsequent assembly and soldering at the site of assembly. Thus various aluminum products such as sheets, strips, rods, wire and tubes or other desirable shapes may be given a thin coating of solder, preferably having the greater proportions of tin, at a convenient point of manufacture of small shaped aluminum products, taken to the site of assembly into larger bodies and the solder coated edges of the aluminum, after further applying a film coating of the flux hereof, placed firmly in contact and merely heated to form the joint by fusion of the solder coating.

Thus for example, aluminum tubing may have a short section such as ¼ to 2 inches from the ends thereof coated with a thin soldered coating comprising tin or solder either on the inside or outside for complementary formation of a pipe or tube joint; or small aluminum pipe fittings, nipples, unions, sleeves, etc. may similarly have their complementary ends coated inside or outside with tin or solder, and such pipe and fittings carried to the site for desirable assembly of the pipe in desired length together with unions, sleeves, and fittings as needed, each contiguous pair of units placed in contact to form a piping assembly together with additional quantities of flux, and more solder if needed, with their complementary tin or solder coatings in firm contact and the joint is then heated until the tin or solder of each complementary coating coated with additional flux fuses into a unitary joint. As indicated, construction by remote assembly of this character is only made possible by the original firm and smooth bond of tin or solder when using the flux of this invention which gives the extremely strong bond as to make assembly of this type practicable. It will be appreciated that other tin or solder-coated aluminum shapes may be analogously assembled at sites remote from the original production site of unit aluminum shape with a thin tin or solder coating.

This invention, as stated, comprises an improvement in soldering and solder coating of aluminum into a practical aluminum joint. As is well known in the art, other metals are readily solderable with any typical soft solder or tin such as zinc, copper, copper alloys such as brass, tinned iron, or iron itself, etc. and this invention makes such other readily solderable metals solderable to aluminum in a strong soldered joint. Thus, while the solder operation hereof will always include a shaped aluminum body as a part of the joint and allows soldering of shaped aluminum bodies to other shaped aluminum bodies, it will also include soldering of such shaped aluminum bodies to any other of such normally solderable metals to produce the firm permanently strong bond hereof, the joint variable in hardness as indicated with the content of tin.

The soldering flux of my invention has three components in homogeneous admixture, each in critical proportions. The first component is a non-drying glyceride oil in which the fatty acid is predominantly oleic acid and I prefer commercial lard oil. The lard is used in this composition in proportion of 27 to 33%. The second component is stable petroleum lubricating oil, substantially free of unsaturated components and commercial additives, preferably a paraffin base oil ranging in viscosity from about 10 to 80 S. A. E. preferably used in the range of 20 to 40 S. A. E. It is a petroleum oil formed from ordinary refining operations such as with acid and decolorizing earths, i. e. fuller's earth on a paraffin base lubricating oil bright stock which has been subjected to no extreme heat treatments to decompose portions thereof other than simple fractionation to remove the volatile hydrocarbons from a crude oil of low boiling character such as gasoline, kerosene and signal oil fractions, desirably having an initial boiling point above about 375° F. Thus the second component is a typical stable lubricating oil fraction somewhat variable in viscosity and desirably free of additives. The second component of this composition is used in the critical proportion range of 24 to 36%. The final component of the flux composition is commercial rosin which may be either of pimaric acid or abietic acid base or mixed base. The rosin is used in the critical proportion of 30 to 40%.

In forming the flux composition the three components are placed in a container and moderately heated and stirred to a homogeneous fluid mass at any moderate temperature such as between 75° to 100° C. The purpose of the mixing and stirring is merely to homogenize the mass allowing the rosin to go into solution; the composition is a viscous fluid liquid or paste.

In use, the end of an aluminum piece to be soldered into a joint may be dipped into the viscous liquid flux or the flux painted by brushing or spraying upon the aluminum. For large soldering operations for covering large surfaces, spraying may be preferred as a method for coating aluminum such as large sheets of aluminum, in which event the viscosity of the flux may be reduced as desired by warming the same to any convenient viscosity reducing temperature such as between 50° to 100° C.

Alternatively, the flux may be dissolved in a liquified carrier gas under pressure, placed in a spray type container under pressure and sprayed as a fine film upon the aluminum to be soldered, such film forming by immediate evaporation of the carrier gas. In some instances volatile solvents may be used to thin the flux for purpose of applying the same as film to the aluminum, having a solder fluxing effect with the aluminum and is desirably allowed to evaporate from the flux coated aluminum after coating and prior to initiating the soldering. Such solvents may be any volatile hydrocarbon solvents or volatile chlorinated hydrocarbon solvents.

In effecting a solder coating using this flux the procedure is such as one generally skilled in the art of soldering other metals will be familiar with. The aluminum work piece is carefully cleaned by brushing to a perfectly clean, shiny, and unoxidized surface of smooth even texture. A thin film of the flux is painted thereover in the area corresponding to that to be coated with solder in a firmly adherent coating. The tinning instrument may be a typical soldering iron but it will be understood that any soldering instrument or machine can be prepared for use herein according to the size and shape of the joint desired for manual or mechanical soldering. The soldering instrument, typically a square bar of copper, has the end thereof shaped by filing to a long fine and smooth surface terminating at a flat dull hatchet-like edge or point. The tool is then heated to a solder fusion temperature and coated with the aid of volatile fluxes, such as sal ammoniac, acid, etc., and a fine smooth solder coating fused thereon. The tin or solder coating thereon must be a perfectly clean continuous and smoothly adherent fluid film upon the hot soldering instrument. Thereafter, solder is added while the hot instrument is held in contact and the solder is fused smoothly and evenly over the flux coated surface of the aluminum, moving the soldering instrument up and back over the surface of the aluminum to be coated until a fine strongly adherent coating of solder or tin has been produced thereon. Where machinery is used for mechanically soldering, the machine will embody the same principle of even movement with heat over the aluminum to fuse the tin or solder thereto in the presence of a previously applied coating of the flux.

The metal piece to which the tin coated sheet of aluminum is to be soldered, if it is another similar sheet of aluminum, will be similarly coated with an adherent fused layer of solder or tin. The two tinned surfaces are coated each with flux and are then brought together and held in close firm contact and both metals to be joined are heated from the outside of the joint sufficient to fuse the coated films of tin or solder together therebetween, and the joint cooled in the position desired to produce the joint hereof. Where a solderable metal other than aluminum is to form part of the joint, the aluminum portion is again first coated, as indicated, with an adherent film of solder and the other metal to be soldered thereto may likewise be coated with solder or tin and the two coated metals then heated to fusion.

For small joints, as in typical small joint soldering such as wire, both metals to be joined are first cleaned and then coated with flux, and the soldering tool bearing the fused tin or solder is held over the joint to heat both metals and allow the molten solder metal to flow into the joint.

It will be understood that the formation of the joint may be made immediately after first tinning (solder coating) of the aluminum in the presence of the flux to form a thin adherent tin or solder coating upon the aluminum. The coated metal then may be cooled, stored and shipped for assembly elsewhere and then, for assembly, it is necessary first to coat each surface with flux, then hold the tin or solder coated surface in firm contact with an opposite tin or solder coated surface of aluminum and heat the metals as held in close assembly until the tin or solder coating on both surfaces fuse into an integral joint adding more solder or tin if necessary to fill any voids or imperfections in the joint.

It is a primary requisite in practicing this invention that the soldering instrument be carefully tinned or coated with solder to have a fused metal coating thereon free of extraneous impurities and fluxes. It is also essential that the aluminum itself be carefully cleaned and coated with the flux as set forth above. The coating will be applied upon wide or narrow surfaces of the aluminum in such area as desired for a subsequent joint.

The following examples will illustrate the practice of this invention.

*Example 1*

A flux is prepared by mixing, heating at about 75° C. and stirring 30% by weight of pure lard, 30% by weight of pure refined 20 S. A. E. paraffin base Pensylvania petroleum lubricating oil and 40% by weight of rosin. On cooling, the product has the consistency of viscous honey or heavy oil and will substantially set to a paste, all particles being either homogeneously dissolved or finely dispersed. An aluminum plate of about 1/16 inch thickness has a flat end cleaned by brushing to smooth white metal for a distance of about 1/2 inch from the edge thereof and is coated by brushing the flux composition thereover to form a smooth thin wet film of flux thereon. A 1/2 lb. pure copper soldering iron is carefully tinned by filing to a flat blunt hatchet-like edge with its sides tapering a distance of about 2 inches from the edge, heating to solder fusing temperature, dipped in sal ammoniac, coated with soft solder comprising about 50 parts by weight of lead and 50 parts by weight of tin, further dipped in dilute hydrochloric acid, wiped to a clean surface and recoated with more solder to form a pure even solder coating on the soldering iron maintained at a temperature substantially above the melting point of the solder. The tin coated soldering iron is then moved gently over the flux coated aluminum surface up and back to form a smooth evenly adherent coating of the solder. A second solder coated aluminum plate is similarly prepared as the first by carefully cleaning and coating with flux and then coating with soft solder of the same composition in about the same film area as in the first coating. The two solder-coated portions on each aluminum plate will have cooled and solidified to thin strongly adherent films. The aluminum plates are then placed in contact with their solder films firmly held together after coating with additional flux and heated with the soldering instrument from the outerside of the plates until the heat transferred through is sufficient to melt the solder coatings after which the heating instrument is withdrawn and the fused metal in the joint allowed to set to form a strong and very permanent solder joint between the two aluminum pieces.

In a modification of this example, after coating the aluminum plate and instead of joining the same to another aluminum plate, any other plate of a solderable metal may have soft solder coated thereon and then such other solder coated metal such as copper, tin, zinc, brass, or iron having a cold solder coating thereon may be placed upon the previously solder-coated aluminum plate after applying an additional coating of the flux hereof upon the solder films and the two metals heated to fuse the solder into a strong joint between the aluminum and the dissimilar metal. Thus, aluminum is soldered by this flux and with this method firmly joined to another strip of aluminum similarly prepared, or to any other solderable metal, such other solderable metal being first solder coated.

*Example 2*

A flux composition is made up by warming and stirring 27% by weight of lard, 36% of 30 S. A. E. paraffin base lubricating oil and 37% of rosin to form a homogeneous fluid mass as in Example 1. A heavy gauge square aluminum plate blank is coated adjacent two opposite ends, on one face and near the remaining two opposite ends on opposite faces with this flux, after first carefully cleaning the edges to form a coated strip extending about ½ inch in from each edge. A similar circular plate is coated on one side near the edge in a circle around the periphery for a distance extending inward about ½ inch, after similar cleaning. A thin solder or tin coating is applied upon each of the flux coated edges of both plates by working the tin or solder coated soldering iron smoothly over the flux coated edges at a temperature above the fusing point of the tin to produce a smooth evenly adherent coating of tin or solder about each edge as described. Thereafter, the tin or solder coated aluminum plates are sent to an assembly point wherein the square aluminum metal blank is die-pressed into a cylinder and, after applying a film of the flux thereto, heated along the mating edges with each tin or solder coating in contact to fuse the same into a strong tin or solder joint of the cylinder. While for purposes of this example the formation is of a cylinder, for practical operation, the cylindrical sides of the product are more accurately that of a frustum of a cone, the plate itself being somewhat trapezoidal rather than square in original cut to allow tapering of the annular walls of the conic section after assembly. The diameter of the circular plate is such as to merely cover the lower diameter opening of the conic section. Thereafter, the circular plate and the lower diameter of the section are crimped into a unit by suitable machinery to form the typical shape of a pail or a washtub with the tin or solder coated portions after first coating with a film of flux overlying each other in tightly crimped contact, the crimping forming the mating sections into a bead. Finally, the press formed tub or pail is merely heated at the joint to fuse the tightly and contiguously held tin coatings into a unitary pure tin or solder joint.

*Example 3*

A sheet of aluminum is first cleaned and flux coated over the entire face using the flux composition set forth in Example 2. It then has a tin coating of high tin content evenly applied over the entire surface by a soldering instrument wherein the clean solder point feeds molten tin smoothly up and back over contiguous areas of the surface until an even tin coating is produced thereon. Another sheet of solderable metal or aluminum is given a coating of tin, and where the second sheet of metal is other than aluminum any conventional flux may be used for coating the same with tin, and where the second sheet of metal is aluminum it is coated in the same manner as the first sheet with a coating of tin. Both tin coated metal sheets are then placed face to face with their tin coatings in firm contact and evenly heated from an outer surface so that both coatings of tin fuse into an adherent bond to form a laminate. Such laminate may be cut into strips for such uses as bimetallic temperature responses or strong laminated metal constructions such as high pressure gas containers and in any use where a laminated aluminum or aluminum clad metal is desired.

*Example 4*

A flux is made by stirring and heating to about 100° C. 33% of lard, 27% of 40 S. A. E. petroleum lubricating oil, and 40% of rosin, all proportions by weight, to form a homogeneous fluid flux. Aluminum tubing has its ends cleaned back by brushing to a bright metal surface for a distance of about 1 inch at both ends. It is coated thereabout over the clean surface with the flux. Thereafter a thin tin or solder coating is applied with a soldering instrument for a distance of about the flux coated portion to form a thin strongly adherent surface coating of tin around each end. Aluminum sleeves about two inches long having a complementary diameter to fit loosely around each end of the tin coated tubing is cleaned on the inside, coated with the flux and also has a thin coating of tin or solder permanently fixed thereto by the same soldering procedure to a depth to fit snugly over the outside of the ends of the coated aluminum tubing using a properly modified soldering tool to fit in the sleeve. Several tubes and fittings thus made are shipped as piping units for assembly and when ready for assembly, two ends of aluminum tubing are inserted within the sleeve, additionally coated with flux, and heated to fuse the tin or solder into an integrally tin or solder bonded piping assembly. At the site of assembly, additional tin or solder may be added at the outer edge of the sleeve to completely seal the same in a circular solder ring as needed. Pipes of various lengths and various types of fittings may be similarly coated for cooperative assembly in this manner.

It will be appreciated that many modifications of this invention will occur to those skilled in the art. Any desirable shapes of aluminum may be tin or solder coated according to this invention to give a stronger joint. The solder may contain varying proportions of tin, at least 35%, the balance being lead and usual impurities. The application of the tin may be used to immediately form a joint during soldering or by merely applying the tin as a coating for subsequent formation of a joint with a cooperative tinned surface, either upon another shape of aluminum, as will be apparent in a manner to one skilled in the art, or with other solderable metals to the aluminum to form a joint of such enhanced strength as were not heretofore available in the art. The examples herein given will be understood to be for purposes of illustration and not limitation except as defined in the claims appended hereto.

I claim:

1. A flux composition for soldering aluminum with a solder comprising at least 35% tin, the balance being lead and usual impurities, said flux consisting of about 27 to 33% of a non-drying glyceride oil wherein the fatty acid is predominantly oleic acid, a petroleum lubricating oil having a viscosity in the range of about 10 to 80 S. A. E. in proportion of about 24 to 36%, the balance being rosin in proportion of about 30 to 40%, all proportions being by weight.

2. A flux composition for soldering aluminum with a solder comprising at least 35% tin, the balance being lead and usual impurities, said flux consisting of about 27 to 33% of lard, a petroleum lubricating oil having a viscosity in the range of about 10 to 80 S. A. E. in proportion of about 24 to 36%, the balance being rosin in proportion of about 30 to 40%, all proportions being by weight.

3. The method of soldering aluminum comprising cleaning the metal surface to be soldered, coating the clean aluminum surface with a flux consisting of 27 to 33% by weight of non-drying glyceride oil in which oleic acid is a predominantly fatty acid, a petroleum lubricating oil fraction having a viscosity of about 10 to 80 S. A. E. in proportion of about 24 to 36% by weight, the balance being rosin in proportion of about 30 to 40% by weight, and applying to said flux coated aluminum surface a molten solder composition comprising at least 35% tin, the balance being lead and usual impurities.

4. The method of forming a solder joint wherein aluminum metal is one of the members of the joint comprising cleaning the aluminum metal, applying a flux coating thereto consisting of 27 to 33% by weight of a non-drying glyceride oil in which the fatty acid is predominantly oleic acid, 24 to 36% by weight of a petroleum lubricating oil and 30 to 40% by weight of rosin, applying to said flux coated aluminum surface a thin firmly adherent coating of solder comprising at least 35% tin, the balance being lead and usual impurities, at a temperature above the fusion point of the solder, smoothing the fused solder evenly over the flux coated surface, allowing the solder to cool to the solder coated surface to form a joint, applying a similar solder coating to a solderable metal placing both solder coated surfaces in firm contact and heating the joint until the solder fuses evenly between both bodies to be joined and allowing the same to cool.

References Cited in the file of this patent

UNITED STATES PATENTS

| Number | Name | Date |
|---|---|---|
| 746,802 | Ellis | Dec. 15, 1908 |
| 1,550,987 | Spoganitz et al. | Aug. 25, 1925 |
| 1,895,133 | Quarnstrom | Jan. 24, 1933 |
| 1,918,197 | Sebell | July 11, 1933 |
| 2,071,583 | Schutt | Feb. 23, 1937 |
| 2,214,422 | Kronquest | Sept. 10, 1940 |
| 2,301,332 | Scheller | Nov. 10, 1942 |
| 2,474,863 | Rinkenbach et al. | July 5, 1949 |
| 2,538,495 | Barry | Jan. 16, 1951 |
| 2,569,149 | Brennan | Sept. 25, 1951 |
| 2,575,413 | Franklin | Nov. 20, 1951 |